J. SCOVIL.
Grain Drill.
No. 41,023. Patented Dec. 22, 1863.
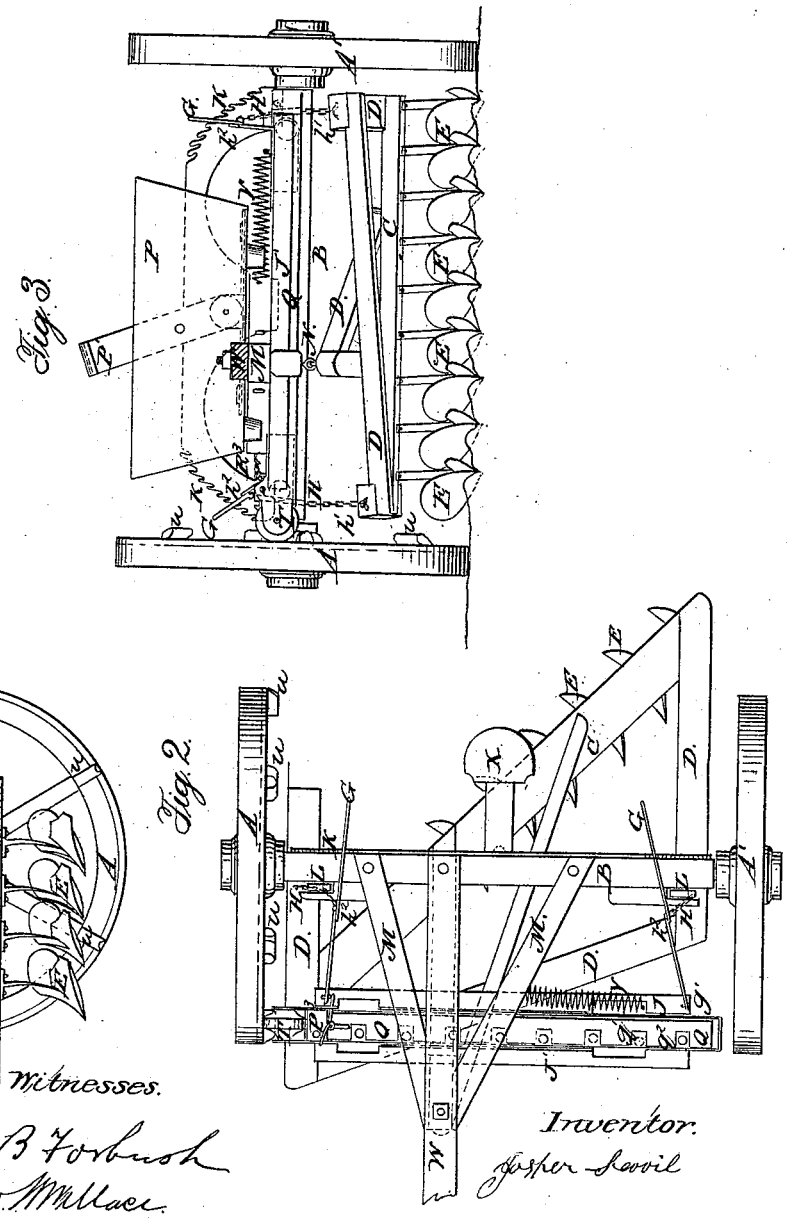

UNITED STATES PATENT OFFICE.

JASPER SCOVIL, OF HAMBURG, NEW YORK.

IMPROVEMENT IN GRAIN-DRILLS.

Specification forming part of Letters Patent No. 41,023, dated December 22, 1863.

*To all whom it may concern:*

Be it known that I, JASPER SCOVIL, of Hamburg, county of Erie, and State of New York, have invented a new and Improved Combined Cultivator and Seed-Drill; and I do hereby declare that the following is a full, clear, and exact description of the construction and operation thereof, reference being had to the accompanying drawings, making a part of this specification, in which—

Figure I is a vertical section, the plows being raised from the ground. Fig. II is a plan view. Fig. III is a front end elevation, the plows being lowered to the ground in a working position.

The nature of my improvements relates, first, to placing and using the plow-beam which supports the plows between the carrying-wheels at an angle of about forty-five degrees to the direct line of motion, which plow-beam also forms part of an adjustable plow-frame, so as to allow the plows to be raised and lowered and fixed for cutting any required depth of furrows, or elevated entirely from the ground for traveling from place to place; second, in imparting to the distributing seed-box a percussive vibrating motion by means of cams placed on the side of one of the wheels, and a friction-wheel upon the end of the box, and a spring operating upon the other end of the box.

Letters of like name or kind refer to like parts in each of the figures.

A and A' represent the carrying-wheels.

B is the axle.

C is the plow-beam.

D are timbers which, together with the plow-beam, constitute an adjustable plow-frame for supporting and raising and lowering the plows, so that they may be fixed to cut any required depth of furrow or elevated from the ground for traveling from field to field.

E represents the plows, which are of common ordinary construction, and are fastened to the plow-beam in any convenient or common manner. They are so placed that they stand on a line at an angle of about forty-five degrees to the direct line of motion, and so that the earth thrown up by each will fall into the furrow made by the plow next forward, and thereby leave the ground smooth. The plow-frame as a whole is raised and lowered by means of the levers G and chains H. The lever is hinged to cross-timber J, as shown at $g'$. One end of the chain is connected to the plow-frame, as shown at $h'$, Fig. III, and the other end is connected to the lever, as shown at $h^2$, Fig. II, so that by lifting upon the levers the plow-frame may be raised and lowered at pleasure.

K represents a notched bar for holding the lever (and hence the plow-frame) at whatever height it may be placed in the notches.

L represents a sheave connected to the axle B, over which the chain passes.

The forward part of the adjustable frame is connected to the stationary frame M by means of a staple, bolt and hook, and washers, as shown at N, Fig. I; or a hook and chain may be used, to render it more quickly adjustable at that point.

This machine, as far as now described, may be used to great advantage as a cultivator; but in order to make it a combined cultivator and seeding-machine I attach a seeding apparatus, as follows:

P represents the main seed-box, which is provided with holes in the bottom and an adjustable slide for regulating the passage of the grain into the distributing seed-box in a common manner.

P' is a lever connecting with the slide in the bottom of the box for the purpose of moving the slide as may be required to insure the passage of the proper quantity of seed.

Q is the distributing seed-box, which is provided with the proper holes $q'$ and adjustable slide $q^2$ in a common manner. The slide is regulated by means of the small lever and pin $R^3$. This box is supported by and moves between the parallel stationary timbers J J'.

On the end of the distributing-box is a friction-wheel, T, and on the side of the carrying-wheel are cams $u$, and on the opposite end of the seed-box is a spiral spring, V. As the wheel revolves the cams strike the friction-wheel, and thereby give the seed-box a percussive outward movement. As soon as a cam has passed the friction-wheel the spiral spring moves the box in the opposite direction, and thereby a constant vibrating percussive motion is imparted to the seed-box, which will insure the proper passage of the seeds through the holes into conducting flexible pipes to sow the seed in the drills.

Flexible pipes may be connected to the seed-box in a common manner to carry the seed down to the ground. The plows, following in the rear, will properly cover the seed.

W is a draft-pole; X, driver's seat.

What I claim as my invention, and desire to secure by Letters Patent, is—

1. Attaching the covering-plows E to the diagonal beam C of an independent frame when the latter is supported and adjusted by means of the chains H, levers G, and rack K, substantially as above described.

2. In combination with the pendent plow-frame, as above described, the distributing seed-box Q, operated by the cams $u$ and spring V, arranged and operating substantially in the manner and for the purpose herein set forth.

JASPER SCOVIL.

Witnesses:
GEO. W. WALLACE,
E. B. FORBUSH.